United States Patent
Patil et al.

(10) Patent No.: US 12,019,867 B2
(45) Date of Patent: Jun. 25, 2024

(54) STORAGE TIERING WITHIN A UNIFIED STORAGE ENVIRONMENT

(71) Applicant: International Business Machines Corporation, Armonk, NY (US)

(72) Inventors: Sandeep Ramesh Patil, Pune (IN); Pushkaraj Balasaheb Thorat, Pune (IN); Sasikanth Eda, Vijayawada (IN); Abhishek Jain, Baraut (IN)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 17/028,267

(22) Filed: Sep. 22, 2020

(65) Prior Publication Data

US 2022/0091738 A1 Mar. 24, 2022

(51) Int. Cl.
*G06F 3/00* (2006.01)
*G06F 3/06* (2006.01)

(52) U.S. Cl.
CPC .......... *G06F 3/0604* (2013.01); *G06F 3/0647* (2013.01); *G06F 3/067* (2013.01)

(58) Field of Classification Search
CPC .... G06F 3/0604; G06F 3/0646; G06F 3/0647; G06F 3/0655; G06F 3/0685; G06F 3/067; G06F 12/08
See application file for complete search history.

(56) References Cited

U.S. PATENT DOCUMENTS

| | | | |
|---|---|---|---|
| 10,176,212 B1 * | 1/2019 | Prohofsky | G06F 16/2365 |
| 10,225,162 B1 | 3/2019 | Jain | |
| 2014/0280382 A1 * | 9/2014 | Gabay | G06Q 10/087 707/812 |

(Continued)

FOREIGN PATENT DOCUMENTS

| | | |
|---|---|---|
| CN | 102411542 A | 4/2012 |
| CN | 104376094 A | 2/2015 |

(Continued)

OTHER PUBLICATIONS

Jianzhe Tai, Bo Sheng, Yi Yao, Ningfang Mi, Live Data Migration for Reducing SLA Violations in Multi-tiered Storage Systems, IEEE (Year: 2014).*

"IBM Linear Tape File System Enterprise Edition V1.1.1.2: Installation and Configuration Guide", An IBM Redbooks publication, IBM, published Jan. 29, 2015, 5 pps., <http://www.redbooks.ibm.com/abstracts/sg248143.html?Open>.

(Continued)

*Primary Examiner* — Reginald G Bragdon
*Assistant Examiner* — Michael L Westbrook
(74) *Attorney, Agent, or Firm* — David K. Mattheis

(57) ABSTRACT

A method for assigning and migrating files among tiers within a unified storage environment. The method includes one or more computer processors determining a plurality of files stored within a tiered storage environment that are accessed by a set executing applications. The method further includes determining that one or more files of the plurality of files are accessed utilizing two or more protocols. The method further includes identifying a group of two or more tiering policies utilized within a tiered storage environment. The method further includes determining protocol-based heat count values corresponding the plurality of files. The method further includes storing the plurality of files among tiers of the tiered storage environment based on the identified group of two or more tiering polices and the protocol-based heat count values corresponding to the plurality of files.

20 Claims, 7 Drawing Sheets

(56) References Cited

U.S. PATENT DOCUMENTS

| | | | |
|---|---|---|---|
| 2017/0153834 A1 | 6/2017 | Islam | |
| 2017/0285973 A1* | 10/2017 | Dalmatov | ............. G06F 3/0665 |
| 2017/0329552 A1 | 11/2017 | Baldwin | |
| 2018/0018379 A1 | 1/2018 | Eda | |
| 2019/0250819 A1 | 8/2019 | Jain | |

FOREIGN PATENT DOCUMENTS

| | | |
|---|---|---|
| CN | 104462240 A | 3/2015 |
| CN | 105207993 A | 12/2015 |
| EP | 3073383 A1 | 9/2016 |
| WO | 2014183514 A1 | 11/2014 |
| WO | 2022062965 A1 | 3/2022 |

OTHER PUBLICATIONS

Mell et al., "The NIST Definition of Cloud Computing", National Institute of Standards and Technology, U.S. Department of Commerce, NIST Special Publication 800-145, Sep. 2011, 7 pages.

Rouse, "erasure coding", TechTarget, SearchStorage, last updated in Nov. 2014, 9 pps., <http://searchstorage.techtarget.com/definition/erasure-coding>.

International Search Report and Written Opinion, International Application No. PCT/CN2021/118229, International Filing Date Sep. 14, 2021.

"Examination Report No. 1 for standard patent application", Australia Application No. 2021350781, Jul. 6, 2023, 3 pages.

\* cited by examiner

STORAGE TIERING WITHIN A UNIFIED STORAGE ENVIRONMENT

BACKGROUND OF THE INVENTION

The present invention relates generally to the field of data storage, and more particularly to assigning or migrating a file among storage tiers within a unified storage environment.

A unified storage environment, also referred to as a network-unified storage environment, or multi-protocol storage architecture, is a storage environment that makes utilizing and managing files and applications possible from a single device. The unified storage environment simultaneously enables storage of file data and processing of block-based input/output (I/O) of some types of applications. The multi-protocol storage architecture (i.e., unified storage environment) consolidates file-based and block-based access in a single storage platform compared to traditional storage systems that are based on either file or block access.

A unified storage environment can also reduce hardware requirements. Instead of separate storage platforms, such as network-attached storage (NAS) for file-based storage and RAID disk arrays for block-based storage, a unified storage environment combines both modes within a single architecture. Users of a unified storage environment also benefit from features such as storage snapshots, replication, tiering, encryption, compression, and data deduplication.

SUMMARY

According to an aspect of the present invention, there is a method, computer program product, and/or system for assigning and migrating files among tiers within a unified storage environment. The method includes at least one computer processor determining a plurality of files stored within a tiered storage environment that are accessed by a set executing applications. The method further includes at least one computer processor determining that one or more files of the plurality of files are accessed utilizing two or more protocols. The method further includes at least one computer processor identifying a group of two or more tiering policies utilized within a tiered storage environment. The method further includes at least one computer processor determining protocol-based heat count values corresponding the plurality of files. The method further includes at least one computer processor storing the plurality of files among tiers of the tiered storage environment based on the identified group of two or more tiering polices and the protocol-based heat count values corresponding to the plurality of files.

DETAILED DESCRIPTION

Figure 1:
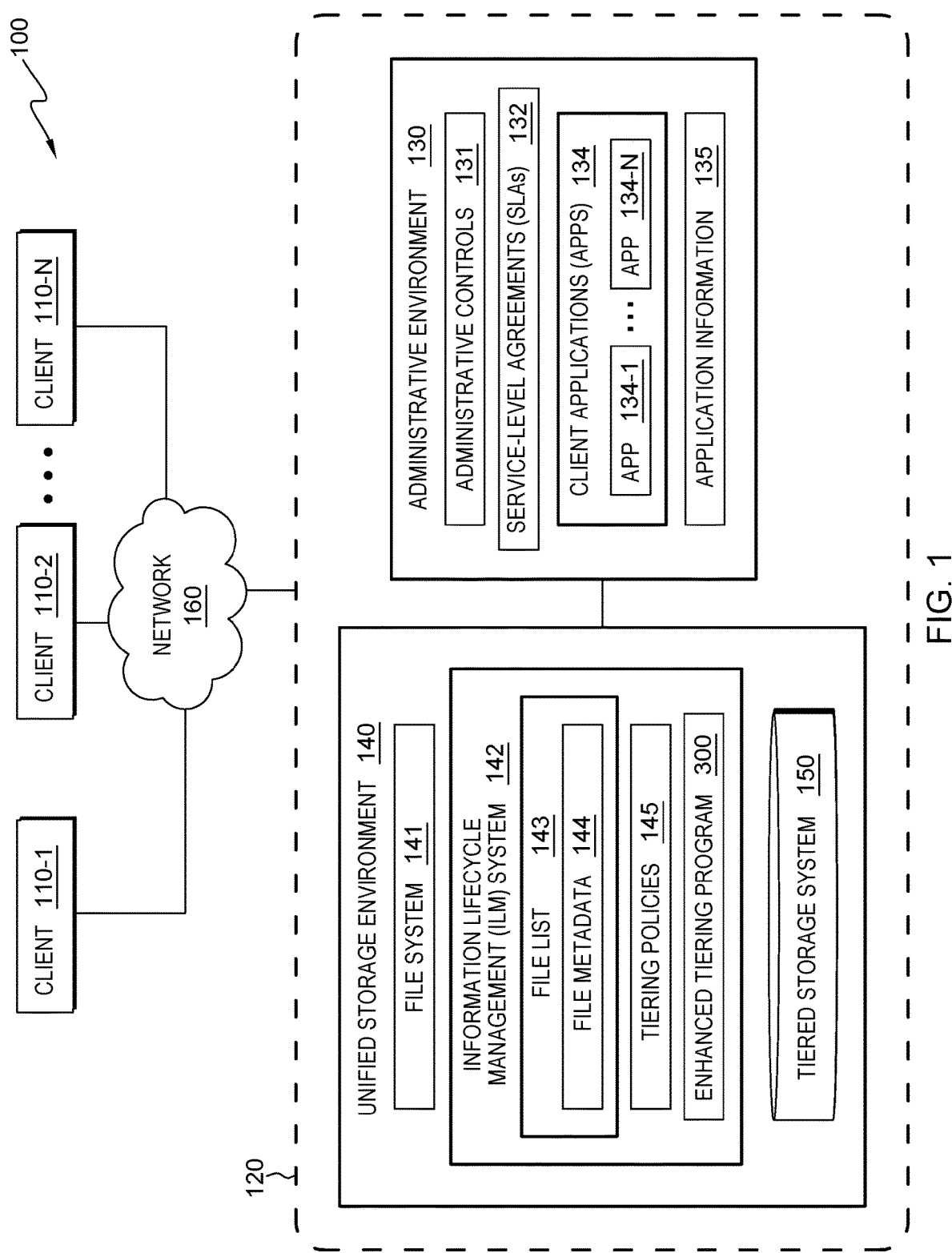
FIG. 1 illustrates a networked-computing environment, in accordance with an embodiment of the present invention.

Embodiments of the present invention recognize that some storage environments are designed to support specific file system protocols and/or data storage structures. Other storage environments are designed to enable users or software applications to access a pool or cluster of files via a plurality of protocols and data storage structures. A unified storage environment is one example of a multi-protocol storage environment or architecture. Embodiments of the present invention recognize that a unified storage environment can support both file-based access protocols, such as server message block (SMB) and network file system (NFS), and block-based access protocols such as Fibre Channel (FC) and Internet small computer system interface (iSCSI). A unified storage environment may also support protocols, such as Object, portable operating system interface (POSIX), Hadoop distributed file system (HDFS), etc.

Embodiments of the present invention recognize that an index node (i.e., inode) related to a file or data object can store attributes and disk block locations of the file or the object within the file system. File system attributes associated with a file may include metadata, such as owner information; permission data; time-based data such as time of last change, access count, access protocol, process IDs that utilize the file, etc.

Embodiments of the present invention recognize that storage systems and storage environments can also include information life cycle management (ILM) systems that include policies dictating the periodic monitoring of stored files to determine the number of accesses of a file, determine an access temperature or a "heat" value related to the file, and subsequently determine if and when the file is migrated from one tier of the storage system to another tier within a tiered storage system. A heat value of a file can be an attribute or a metadata element that provides a means of optimizing file assignment or migrating file within a tiered storage system based on policies of an ILM system associated with the tiered storage environment. Heat count values are relative attributes that indicate whether a file is "hotter" or "colder" than the access rates related to other files within a pool of files, such as a namespace. In various scenarios, heat-count based ILM policies are utilized to determine when to migrate hotter files to higher (e.g., faster) storage tiers and when to migrate other colder files to lower (e.g., slower or archival) storage tiers.

Embodiments of the present invention also recognize that within a clustered file system environment or namespace including a plurality of files, file heat is maintained as an attribute of the file and that the heat of a file increases or decreases based on the number of times the file is assessed in comparison with other files in the cluster or namespace for a configured monitoring interval. A file heat count value is not protocol specific. In some instances, a heat count value corresponding to a file is affected by accessing the file via any protocol.

Embodiments of the present invention recognize that, whereas one protocol may affect a performance related to accessing the file, another protocol accessing the file may affect the overall storage performance (e.g., frequent movement of blocks between the storage tiers results in unnecessary power usage, network traffic, memory wastage, etc.) of the system that stores the file. In addition, embodiments of the present invention also recognize that applications utilizing the file can suffer from inconsistencies in terms of performance related to migrating the file among storage tiers. In addition, embodiments of the present invention recognize that storage tiering based on file heat is intended to optimize non-volatile storage, not memory usage. Therefore, cache hits or in-memory accesses associated with the file are not included when calculating a file heat count value.

Embodiments of the present invention further recognize that the computing resources utilized by differing protocols to access a file utilized by multiple applications are not a factor utilized by the unified storage environment to determine whether a file is migrated between storage tiers. In addition, embodiments of the present invention also recognize that tiering policies within the unified storage environment do not include other factors, such as whether a file is designated as mission-critical or whether the file is accessed by an application (app) designated as high-priority when determining whether to migrate a file to another storage tier.

Embodiments of the present invention improve storage tiering decisions related to files within a unified storage environment by enhancing the in-memory inode table fields, on-disk inode tables, and/or metadata related to a file. Inode tables are utilized to capture the processes accessing the respective erasure code fragment inodes, map file metadata with the protocol server's process IDs, and track file heat count values related to a file by at least protocol, which is further used in optimizing file assignment or migration decisions among storage tiers. If inode metadata corresponding to a file cannot be modified to track heat count values of a file by protocol and/or priority, then other embodiments of the present invention utilizes extended file attributes associated with the file to store the metadata relate to protocol-based and/or priority-based heat metadata information, such as respective heat count values.

One embodiment of the present invention is utilized with respect to unified storage environments that stores data via erasure coding. Erasure coding is a method of data protection in which data is broken into fragments, expanded and encoded with redundant data pieces, and stored across a set of different locations or storage media. However, embodiments of the present invention are not constrained to file storage utilizing erasure coding. Other embodiments of the present invention are utilized in association with other file storage systems, replication and/or data protection methodologies, or a combination thereof.

The descriptions of the various scenarios, instances, and examples related to the present invention have been presented for purposes of illustration but are not intended to be exhaustive or limited to the embodiments disclosed.

The present invention will now be described in detail with reference to the Figures. FIG. 1 is a functional block diagram illustrating networked-computing environment 100, in accordance with embodiments of the present invention. In an embodiment, networked-computing environment 100 includes, client 110-1 and client 110-2 through client 110-N, and data processing environment 120, all interconnected over network 160. In one embodiment, networked-computing environment 100 represents a portion of a data center within a single physical location. In some embodiments, one or more elements of networked computing environment 100 are distributed among differing physical and/or geographic locations, such as unified storage systems distributed within a cloud-computing environment.

Client 110-1 and client 110-2 through client 110-N, and data processing environment 120 may be personal computers, desktop computers, mainframe computers, etc. In certain embodiments, data processing environment 120 (e.g., administrative environment 130 and unified storage environment 140) represent a computer system utilizing clustered computers and components (e.g., database server computers, application server computers, etc.) that act as a single pool of seamless resources when accessed through network 160, as is common in data centers and with a cloud-computing architecture. In general, client 110-1 and client 110-2 through client 110-N, data processing environment 120, administrative environment 130, and unified storage environment 140 are representative of any programmable electronic device or combination of programmable electronic devices capable of executing machine readable program instructions and communicating via network 160. Client 110-1 and client 110-2 through client 110-N and data processing environment 120 may include components, as depicted and described in further detail with respect to FIG. 4, in accordance with embodiments of the present invention.

In some embodiments, one or more of client 110-1 and client 110-2 through client 110-N represent a computing system, a personal computing device, a mobile device, such as a smartphone; an interface for a hosted application; etc., that enable a user to remotely execute one or more apps of client apps 134 within data processing environment 120. In an embodiment, client 110-1 and client 110-2 through client 110-N include programs and data (not shown), such as an operating system, a web interface, communication software, a client interface respectively associated with an app included within client applications 134, etc.

In other embodiments, one or more of client 110-1 and client 110-2 through client 110-N represent hosted computing entities, such as virtual machines (VMs), containers, application program interfaces (APIs), etc., within networked-computing environment 100 that execute one or more apps of client apps 134 within data processing environment 120 without human intervention. In an example, client 110-2 may be as a financial transaction processing app that interfaces with a fraud detection app (e.g., app 134-5 (not shown)), or an API that executes another function, such as app 134-2 (not shown) in response to an event. For example, an Internet-of-things device activating and transmitting images in response a proximity trigger.

In one embodiment, data processing environment 120 represents an enterprises data processing environment. In another embodiment, data processing environment 120 represents a cloud-based data processing environment, such as a platform-as-a-service (PaaS) environment or a cloud-computing system (described in further detail with regard to FIG. 5 and FIG. 6), in accordance with various embodiments of the present invention In an embodiment, data processing environment 120 includes one or more instances of administrative environment 130 and/or one or more instances of unified storage environment 140. In various embodiments, data processing environment 120 includes compute capabilities (not shown) separate from administrative environment 130 and unified storage environment 140. Administrative environment 130 and unified storage environment 140 may communicate via aspects of network 160, utilize a network (not shown) internal to data processing environment 120, or a combination thereof. In a further embodiment, administrative environment 130 and/or unified storage environment 140 can operate as one or more computing nodes in a cloud computing environment (described in further detail with regard to FIG. 5 and FIG. 6), in accordance with various embodiments of the present invention In an embodiment, administrative environment 130 can be a computer or a set of computers utilized to administer and control various aspects of data processing environment 120. Administrative environment 130 includes administrative controls 131, service-level agreements (SLAs) 132, client applications (apps) 134, application information 135, and a plurality of other programs and data (not shown). The other programs and data may include a system management facility (SMF), a hypervisor, virtualization software, an application orchestration system, communication software, etc. In various embodiments, some programs and data within administrative environment 130 are utilized to interface and/or control aspects of unified storage environment 140; access, update, and/or control files stored within unified storage environment 140; communicate information related to clients (e.g., users) and apps associated with clients; received data from a client for inclusion within unified storage environment 140; etc.

In addition, administrative environment 130 processes remote procedure calls (RPC) among entities associated with data processing environment 120, such as an RPC initiated by a client device or entity, or RPCs executed by an app within administrative environment 130 to access files and data within unified storage environment 140. Information included within RPC handshakes can be assigned and/or collected for an app based on the ID corresponding to the app and associated with one or more files called by the app. In one example, an RPC handshake associated with an app executing within administrative environment 130 and unified storage environment 140 may also include access protocol respectively associated with a file, priority values, criticality information, weight factors related to protocols and/or priorities, app IDs, etc. In another example, an RPC handshake from a client or user may also include a "nice" value associated with executing an app and/or a preferred storage tier required for the app. In some instances, the priorities associated with an app are determined by the user, but can be constrained by the service level agreement (SLA) associated with the app and/or the user of the app.

Administrative controls 131 may include metering and billing programs, an administrative console program, authentication and security programs, a scheduler, a load-balancer, etc., (not shown). In an embodiment, administrative controls 131 controls a priority or range of priorities assigned to an executing app of APPs 134 based on a service level agreement (SLA) relate to the app and various other factors related to data processing environment 120, such as an availability of computing resources and/or storage capacity within unified storage environment 100, the set of apps executing within data processing environment 120, and SLAs of SLAs 132 corresponding to the set of apps of apps 134 executing within data processing environment 120, etc. In various embodiments, administrative controls 131 interfaces with various aspects of unified storage environment 140, such as enhanced tiering program 300.

In another embodiment, administrative controls 131 utilizes information within application information 135 to determine a set or a range of resources to provision or allocate to an app. In some scenarios, administrative controls 131 also control the allocation of computing and storage resources within data processing environment 120 among the plurality of executing apps during a given period of time. In other scenarios, administrative controls 131 allocates computing and storage resources of data processing environment 120 to client environments (not shown), such as logical partitions (LPARs), VMs, and/or virtual servers as opposed to allocating resources to individual apps. In other embodiments, administrative controls 131 is utilized to control aspects of unified storage environment 140, such as creating or updating a storage tiering policy (i.e., tiering policy) of tiering policies 145. In addition, administrative controls 131 share information with unified storage environment 140, such as information associated with RPCs of an app and other information related to the app included within application information 135.

In some embodiments, administrative controls 131 responds to dynamic changes, such as a user-initiated change to a "nice" value corresponding to an executing app. In various scenarios, administrative controls 131 assigns the kernel-level or root-level priority value corresponding to an app to execute based on an associated SLA, whereas a user or client utilizes a "nice" value to modifies a priority assigned to the executing app. In an embodiment, a "nice" value refers to a user-level input that affects one or more aspects of an execution application. One type of "nice" value modifies a priority assigned to an app with respect to processing power or an assignment of processor cores. Another type of "nice" value affects 110 activity priorities. Based on the configuration and/or operating systems of data processing environment 120, the range of priority values and user-modifiable "nice" values can vary. In some instances, a "nice" value may be limited to enhancing or degrading the priority value of an app by 15% to 20%. As such, a low priority app with a large "nice" value could not utilize more processing power or time-slices of data processing environment 120 than another app executing at a high priority or associated with a higher-level SLA with a zero "nice" value.

Service-level agreements (SLAs) 132 include a listing of differing service package offerings and related quality of service (QoS) information, metrics (e.g., details) corresponding to each SLA, and/or end-user agreement (EUA) information. An SLA may include a list of services that are provided, a performance level (e.g., reliability and responsiveness), monitoring processes, problem/issue reporting dictates, response time dictates, resolution time-frame metrics, a range of assignable execution priorities, a quantity or availability of computing resources, constraints related to storage tiering, etc. In one example, a lower-level SLA may dictate that a priority assigned to an app/client may be reduced to improve the performance of another app/client with a higher-level SLA. In another example, SLAs 132 may include dictates associated with "nice" values, such a constraining the range of "nice" values that a user or client can apply to an executing app, or the effect of a "nice" value on the priority value assigned to an executing app. In another example, a lower-level SLA may limit tier-based file assignments or file migrations within a 5-tier storage system to tiers 2-5, whereas a high-level SLA may bias the set of values of a tiering policy toward one or more higher-performance tiers.

In one embodiment, SLAs 132 can include an SLA specific to given client, such as client 110-1 and/or a group of general SLAs respectively associated with a client, such as gold, silver, and bronze-level SLAs. In some embodiments, each client or group of client apps can be respectively associated with different SLAs, such as internal business apps are governed by a first SLA, consumer-facing web apps are governed by a second SLA, and apps designated as mission-critical may be governed by a third SLA. Alternatively, a client may have various apps or services covered by different levels of a multi-level SLA. In addition, an SLA may dictate the criticality values or range of values that a user can assign to a criticality designation.

Client apps 134 includes a plurality of software and applications of users, businesses, enterprises, etc., represented by app 134-1 through app 134-N. In various embodiments, one or more apps within client apps 134 are initiated by a client device or entity external to data processing environment 120, such as client 110-1 and client 110-N.

Application information 135 can include a database or other data storage structure (not shown) that includes data and information associated with the apps hosted by data processing environment 120 and respectively associated with the clients that utilizes data processing environment 120, such as client 110-2 and client 110-N. In an embodiment, application information 135 includes lists of the plurality of files called or utilized by each app of client apps 134; configuration information corresponding to a client and/or app, such as computing resources allocated to an app or provisioned to an environment associated with executing the app; a SLA respectively associated with the app; etc. Some information within application information 135, related to an app, is passed via within an RCP handshake between elements within networked-computing environment 100, such as a priority value, an app ID, a file access protocol, etc. Application information 135 may also include historical priority, "nice" values from previous execution of an app, some RPC information, etc.

In another embodiment, application information 135 further includes information related to an app, such as a preferred initial location for a file accessed by an app, a criticality value assigned to an app, a criticality dictate in addition to SLA considerations, etc. For example, one client may designate an app as high-important (criticality value=75), but a second client may designate the same app as both mission-critical (criticality value=90) and executes at a high priority. In some embodiments, application information 135 includes dynamic information or data assigned by administrative controls 131, such as an execution priority or range of priorities to assign to the app, administrative information related to an executing app dynamic information input by a client/user, process IDs corresponding to an app, changes by a user or client to a "nice" value assigned to an executing app, etc.

In one embodiment, unified storage environment 140 includes file system 141, information lifecycle management (ILM) system 142, and tiered storage system 150. Unified storage environment 140 may also include a plurality of other programs and data (not shown), such as one or more operating systems, virtualization software, communication programs, resource management system, etc. In an embodiment, some aspects of unified storage environment 140 are controlled by administrative environment 130, such as computing and storage resources allocated to an executing app, tiering policies constraints associated with an SLA of a client or an app, etc.

In some embodiments, data processing environment 120 defines rules; criteria; and various hierarchies, such as an analysis hierarchy among access protocols, app priority values, SLAs, or app criticality values; dictate algorithms and/or values related to ILM system 142 and associate tiering policies; etc. In some scenarios, an administrator of data processing environment 120 defines some of the rules, criteria, and various hierarchies, algorithms and values, etc., utilized within, such as elements associated with ILM system 142. In other scenarios, an SLA corresponding to a user or apps of a user permits the user to modify some rules, criteria, hierarchies, algorithms and values, etc., utilized within unified storage environment 140. For example, a user with an SLA related to apps designated as mission-critical can modify an analysis hierarchy among access protocols by identifying the one or more access protocols utilized by mission-critical apps within application information 135, and/or modify values, such as a weight factor within an algorithm related to a priority-based tiering policy of ILM system 142.

In an embodiment, file system 141 supports a set of protocols utilized to access (e.g., create, read, write, update, delete, etc.) a plurality of files stored within tiered storage system 150 based on information and/or commands received from administrative environment 130. For example, file system 141 supports SMB, NFS, Object, POSIX, and HDFS protocols. In another embodiment, file system 141 also supports inode structures, extended data attributes, metadata tracking and modification, block and file structures, etc. File system 141 may also include file clustering and namespace management capabilities. File system 141 utilizes information obtained from administrative environment 130 to determine an initial or preferred tier assignment of a file within tiered storage system 150. In various embodiments, file system 141 also includes software and algorithms utilized to store files in various formats or data structures, such as a Reed-Solomon algorithm for erasure coding of data and other fault-tolerant storage methods and storage schemes, such as RAID (Redundant Array of Independent Disks) storage, etc.

In some embodiments, file system 141 also includes file monitoring programs and daemons (not shown) that track file accesses counts among persistent storage and volatile storage elements, such as persistent storage included within tiered storage system 150, and in-memory storage and/or cache (not shown) included within data processing environment 120. File system 141 also includes a heat mapping program (not shown) utilized to determine the access counts of files with respect to configurable monitoring periods (e.g., windows of time) and based on various file clusters and/or namespaces. In some scenarios, file system 141 updates metadata (i.e., information) within metadata 144 corresponding to files stored within tiered storage system 150, such as respectively utilized access protocols, heat count values respectively associated with an access protocol, information included with RPC handshakes and/or RPCs, etc. In a further embodiment, a determined heat count value corresponding to a file may be modified by one or more factors to generate an effective heat count value. One example of effective heat count values is a priority-based heat count, described in further detail with respect to FIG. 2b.

In an embodiment, ILM system 142 includes, file list 143, file metadata 144, tiering policies 145, enhanced tiering program 300, and other programs and data (not shown). In various embodiments, ILM system 142 obtains information and data from various aspects of unified storage environment 140, file system 141 to determine access counts and/or file heat count values respectively associated with the plurality of files stored within tiered storage system 150, identified within file list 143, and further associated with a protocol utilized to access the file and/or a priority of an app that access the file. ILM system 142 updates the instance of file metadata 144 corresponding the file with the obtained information and data related to the file.

In some embodiments, ILM system 142 also includes a set of algorithms (not shown) that modify or determine (e.g., calculate) a set of heat count values corresponding to a group of storage tiers associated with a tiering policy of tiering policies 145 based on the number of storage tiers within tiered storage system 150, a number of protocols utilized to access a share and one or more other factors. In one example, an algorithm of ILM system 142 may determine a cumulative (e.g., summed, total) set of heat count values and/or set of effective heat count values associated with tiers of a tiering policy based one or more factors, such as a number of concurrently executing apps that access a common file, a value related to a protocol, a range of priorities of executing apps, etc. In another example, other algorithms of ILM system 142 utilize priority information and other factors to determine an effective heat count value corresponding to a file, such as a priority-based heat count (PBHC). In another embodiment, ILM system 142 dictates that analyzing heat count values corresponding to a file with subsequent tiering policies, within a hierarchical group of tiering policies, can upgrade (e.g., improve) the storage tier assignment of a shared file, but disallows (e.g., does not permit, prevents) downgrading the assignment of the shared (e.g., common) file based on a tiering policy lower in the hierarchy.

In an embodiment, file list 143 represents a list file utilized or accessed by a plurality of executing apps within data processing environment 120, such as app 134-1 through 134-N. In an embodiment, file list 143 further includes file metadata 144. In some embodiments, file list 143 tracks a tier location corresponding to a file prior to access, a determined tier location based on one or more factors including a file heat count value, and a storage tier assigned to a file in response to a cessation of access (e.g., apps utilizing file terminate).

File metadata 144 includes a plurality of instances of metadata corresponding to the files (not shown) within file list 143. In an embodiment, an instance of metadata 144 corresponding to a file includes, one or more process IDs utilizing the file, a file access count, information identifying a file access protocol (e.g., SMB, NFS Object, POSIX, HDFS, etc.), etc. In some embodiments, an instance of file metadata 144 corresponding to a file is included within an inode map corresponding to the file. In other embodiments, an instance of file metadata 144 corresponding to a file is included within the extended attributes corresponding to the file or within the extended attributes of an inode map corresponding to the file. In various embodiments, file system 141 updates metadata respectively associated with a file, such as adding a new access protocol within the extended attributes and/or modifying heat count values based on different configuration for a given protocol.

In one embodiment, tiering policies 145 includes a plurality of policies that dictate (e.g., determine) a storage tier within tiered storage system 150 where a file is assigned or migrated, based on one or more criteria, such as sets of protocol-based heat count values, sets of priority-based heat count values, a an analysis hierarchy among a group of tiering policies (described in further detail with respect to FIG. 2A, and FIG. 2B), etc. In various embodiments, the number of tiers within a set of policy of tiering policies 145 utilized by enhance tiering program 300 is based on the configuration of tiered storage system 150.

Tiered storage system 150 is an architecture based on a group of two or more type of storage media. Tiered storage system 150 is divided into a group of tiers based on a heat designation assigned to a tier. For example, an instance of tiered storage system 150 may include a group of three tiers that are respectively associated with file access temperature designations, such as a "hot" tier consisting of solid-state disk drives (SSD); a "warm" tier consisting of hard disk drive; and a "cold" tier consisting of archival storage media, such as magnetic tapes. In some embodiments, tiered storage system 150 includes a group of more than three tiers and/or sub-tiers. In one example, tiered storage system 150 may further include sub-tiers within the HDD tier based on HDD capacity and/or speed, such as 5.4 K rpm HDDs, 7.2 K rpm HDDs, and 15 K rpm HDDs. Similarly, the "hot" SSD tier may include one sub-tier of SSDs designated for storing file associated with high write rates and another sub-tier SSDs designated for storing files associated with a high percentage of read accesses. In another example, tiered storage system 150 may include one or more tiers a tier above an SSD tier based on other types of storage media, such as an in-memory tier utilizing volatile memory (e.g., dynamic random-access memory (DRAM)), and/or, a tier based on storage class memory (SCM).

In some embodiments, each tier of tiered storage system 150 is further configured or subdivided based on file clustering and/or namespaces where groups of files are logically isolated but can be stored among the same storage media (e.g., storage devices of a tier).

Enhanced tiering program 300 is a program that determines a storage tier for a file within unified storage environment 140 based on heat count values related to various criteria, such as protocol-based heat count values, priority-based heat count values, an analysis hierarchy among tiering policies, etc. In an embodiment, enhanced storage program 300 utilizes information within a set of metadata respectively associated with a file (e.g., an instance of file metadata 144) and one or more policies within tiering policies 145 to determine whether to migrate a file among tiers of tiered storage system 150. In addition, enhanced tiering program 300 can respond to changes among tiering policies as number of executing apps that utilize a file change. In some embodiments, enhanced tiering program 300 utilizes an analysis hierarchy among tiering policies to determine whether a file is migrated among tiers of tiered storage system 150 in response to determining that two or more conditions are met, such as a difference among heat count values corresponding to a file with respect to differing access protocols.

In various embodiments, enhanced tiering program 300 determines whether file migration among tiers of tiered storage system 150 is protocol-based or priority-based by analyzing information related to a set of two or more concurrently executing apps that access a common (e.g., the same) file. In some scenarios, in response to determining that file migration among tiers is priority-based, enhanced tiering program 300 determines a respective priority-based weight factor for each executing app. A respective weight factor is applied to a heat count value corresponding to a file accessed by an app. In other scenarios, enhanced tiering program 300 determines file migration among tiers of tiered storage system 150 is based on a combination of factors related to the concurrently executing apps that access a set of file based on determining another weight factor that is applied to a heat count value corresponding to each utilized access protocol and a tiering policy that is based on protocols in addition to priorities.

In one embodiment, client 110-1 and client 110-2 through client 110-N communicates through network 160 to data processing environment 120. Network 160 can be, for example, a local area network (LAN), a wide area network (WAN), such as the Internet, a telecommunications network (e.g., a portion of a cellular network), a wireless local area network (WLAN), such as an intranet, or any combination of the previous and can include wired, wireless, or fiber optic connections. In general, network 160 can be any combination of connections and protocols that will support communications between client 110-1 and client 110-2 through client 110-N, and data processing environment 120, in accordance with embodiments of the present invention. In some embodiments, network 160 also provides communications among portions of data processing environment 120, such as administrative environment 130 and unified storage environment 140. In various embodiments, network 160 operates locally via wired, wireless, or optical connections and can be any combination of connections and protocols (e.g., personal area network, near field communication (NFC), laser, infrared, ultrasonic, etc.).

Figure 2A:
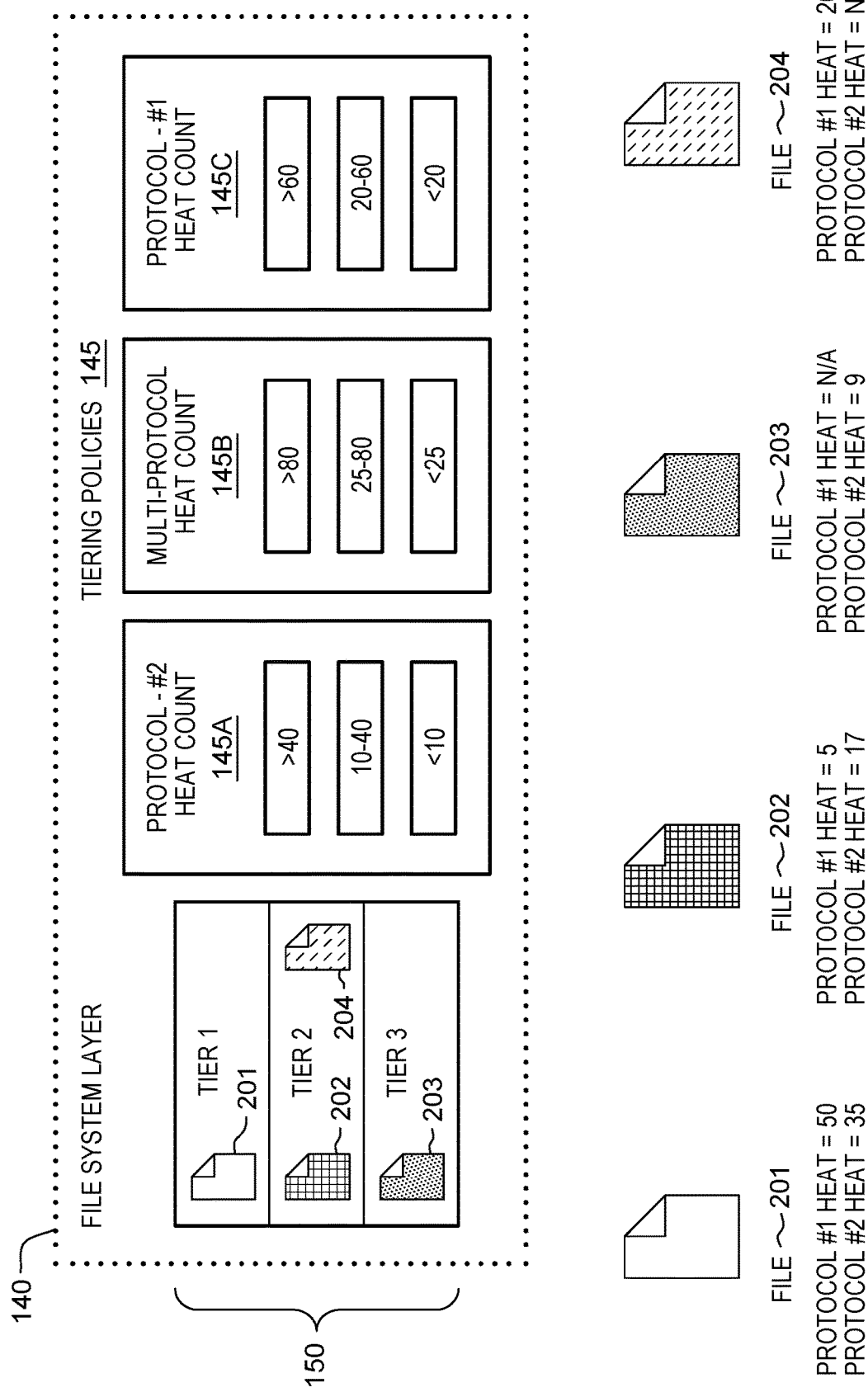
FIG. 2A depicts an illustrative example of assigning/migrating files among storage tiers based on tiering policies and protocol-based heat count values, in accordance with an embodiment of the present invention.

FIG. 2A, is an illustrative example of migrating and/or assigning files among storage tiers based on protocols, file heat counts, and tiering policies, in accordance with embodiments of the present invention. In an embodiment, FIG. 2A indicates that unified storage environment 140 includes three protocol-based heat count tiering policies within tiering policies 145, policy 145A, policy 145B, and policy 145C, and a three-tiered (e.g., tier 1, tier 2, and tier 3) instance of tiered storage system 150.

In the illustrative example of FIG. 2A, unified storage environment 140 depicts an analysis hierarchy among the three tiering policies. In the illustrative example, policy 145A, a tiering policy based on protocol #2 is invoked first to analyze heat count values corresponding to a file. Policy 145B, a multi-protocol tiering policy is invoked second analyze heat count values corresponding to a file. Policy 145C, a tiering policy based on protocol #1, is invoked last analyze heat count values corresponding to a file. In some embodiments, the analysis hierarchy among tiering policies is based on information included within application information 135, SLAs 132, and/or ILM system 142. Further, various aspects of ILM system 142 are utilized to calculate a set of heat count values for one or more policies that dictate the storage tier that is assigned a file or receives a migrated file.

The illustrative example of FIG. 2A also depicts unified storage environment 140 as storing file 201 (no fill), file 202 (cross-hatch fill), file 203 (speckled fill), and file 204 (diagonal-hash fill) among the tiers of tiered storage system 150. Further, file 201, file 202, and file 204 are accessed by one or more apps, such as app 134-1 utilizing protocol #1. File 201, file 202, and file 203 are accessed by a different one or more apps, such as app 134-4 (not shown) utilizing protocol #2. Continuing the example, during a monitoring period, file system 141 determines a heat count value corresponding to a depicted file and respectively associated with a protocol utilized to access the file. For example, file 201 is depicted as having a heat count value=50 with respect to protocol #1 and a heat count value=35 with respect to protocol #2.

As previously discussed with respect to ILM system 142, one or more algorithms included within ILM system 142 and information associated with at least one of the two executing apps that access file 201, file 202, file 203, and/or file 204 are utilized to determine (e.g., calculate) the set of heats (i.e., heat count values) associated with at least policy 145B.

In the illustrative example, policy 145A dictates that file 201 is assigned (e.g., stored or migrated) to tier 2 based on a protocol #2 heat=35, file 202 is assigned to tier 2 based on a protocol #2 heat=17, and file 203 is assigned to tier 3 based on a protocol #2 heat=9. File 204 is not assigned a tier based on policy 145A because file 204 is not accessed utilizing protocol #2.

Next, policy 145B dictates that based on summing the respective heats for protocol #1 and protocol #2 (cumulative heats=85) that file 201 is upgraded to tier 1; and that file 202 (cumulative heats=22) remains assigned to tier 2. Neither file 203 nor file 204 is affected by policy 145B, each file is accessed utilizing a single protocol.

Subsequently, policy 145C indicates that file 201 should be assigned to tier 2, protocol #1 heat=50. Policy 145C further indicates that file 202 should be assigned to tier 3, protocol #1 heat=5. However, since in an embodiment ILM system 142 prevents downgrading of a tier assignment for a file during the same monitoring period, file 201 remains assigned to tier 1 and file 202 remains assigned to tier 2. Policy 145C indicates that file 204 is assigned to tier 2, protocol #1 heat=20. File 203 is unaffected by policy 145C and remains assigned to tier 3, file 203 is not accessed utilizing protocol #1.

Figure 2B:
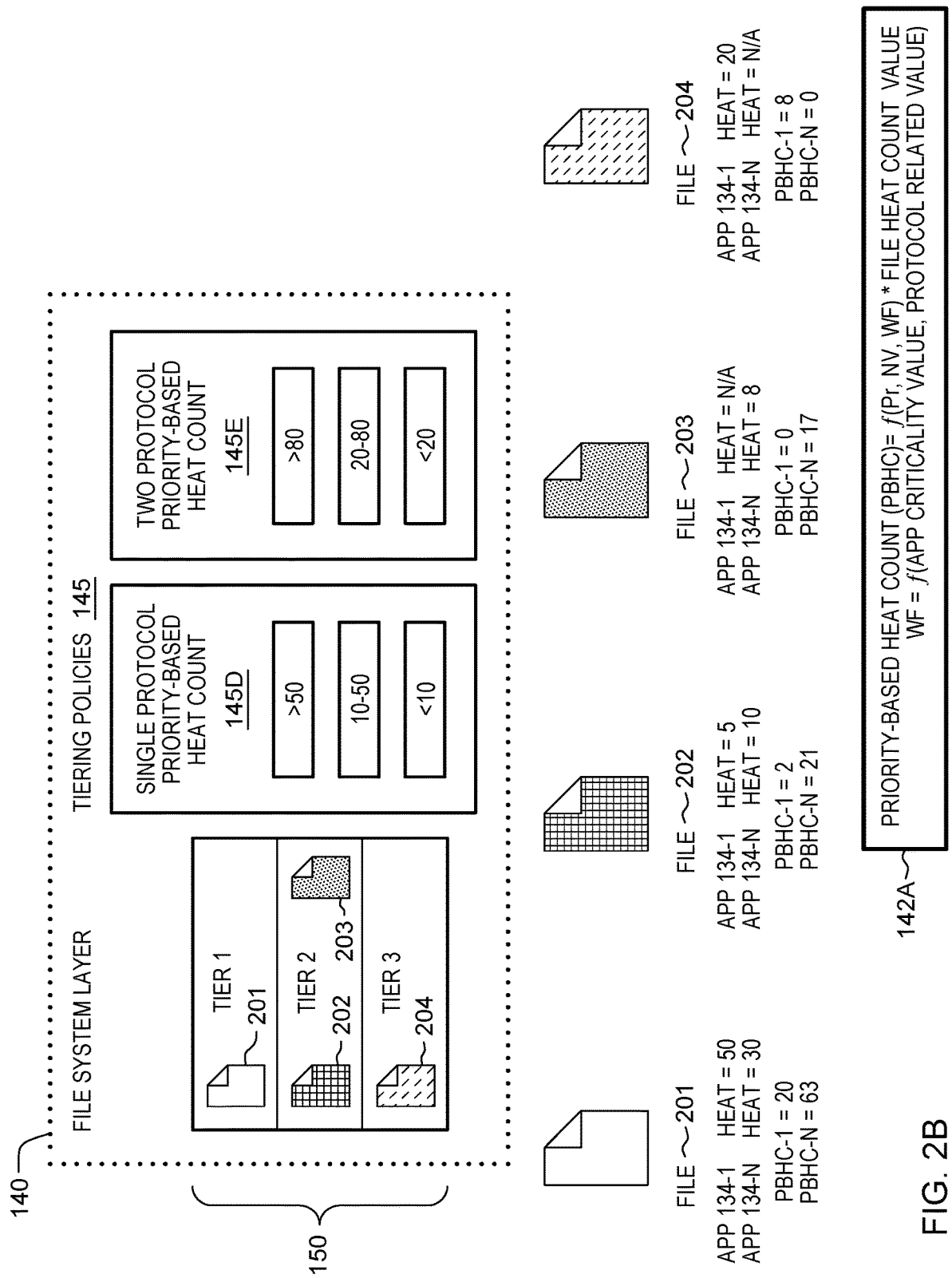
FIG. 2B depicts an illustrative example of assigning/migrating files among storage tiers based on tiering policies and heat count values related to priorities and/or protocols, in accordance with an embodiment of the present invention.

FIG. 2B, is an illustrative example of migrating and/or assigning files among storage tiers based on at least application priorities, file heats, and tiering policies, and an example priority-based heat algorithm, in accordance with embodiments of the present invention.

In another example embodiment, FIG. 2B indicates that unified storage environment 140 includes two priority-based heat count tiering policies within tiering policies 145, and a three-tiered (e.g., tier 1, tier 2, and tier 3) instance of tiered storage system 150. In an embodiment, policy 145D is based on a set of priority-modified heat count values associated with a single protocol (e.g., an unspecified protocol), and policy 145E is based on heat values associated with two protocols. In the current example, policy 145D and policy 145E are not depicted based on an analysis hierarchy. The illustrative example of FIG. 2B further depicts unified storage environment 140 as storing file 201 (no fill), file 202 (cross-hatch fill), file 203 (speckled fill), and file 204 (diagonal-hash fill) among the tiers of tiered storage system 150. In addition, the current illustrated example includes algorithm 142A.

In the illustrated example of FIG. 2B, algorithm 142A represents a generalized algorithm utilized to determine a priority-based effective heat count value, such as a PBHC corresponding to a depicted file. For example, file 201 has a file heat=50 respectively associated with APP 134-1 and a corresponding PBHC-1=20. In an illustrative embodiment, algorithm 142A determines an PBHC by modifying a heat value corresponding to a file and respectively associated with an app, by utilizing another value determined by a function that utilizes a plurality of inputs, such as a priority (Pr) corresponding to an app, a "nice" value (NV) associated with the app, and a weight factor (WF). The WF associated with algorithm 142A is based on another function utilizing a criticality value of the app and a value relate to a protocol utilized by the app to access a file. A given instance of algorithm 142A may be created by administrator, a client, and/or a user of data processing environment 120. Each instance of algorithm 142A or another algorithm within ILM system 142 may be tuned for a particular instance of unified storage environment 140, a namespace within an instance of unified storage environment 140, a set of users, etc.

In the illustrative example of FIG. 2B, APP 134-1 and APP 134-N access file 201 and file 202. File 203 is accessed only by APP 134-N, and file 204 is accessed only by APP 134-1. In addition, in the illustrative example APP 134-1 and APP 134-N access files within unified storage environment 140 based on differing protocols (not shown). Each depicted file includes at a heat value corresponding to at least one app. In addition, each depicted file is further associated with one or more respective priority-based heat counts (PBHCs) respectively associated with an app, such as PBHC-1 and PBHC-N calculated utilizing an instance of algorithm 142A and various factors/inputs (not shown). In an embodiment, a PBHC value=0 indicates that an app did not access a file via a given protocol.

In the illustrated example, if a priority associated with an app were not a factor, then policy 145E would assign file 201 to tier 2 (summed file heats=80). However, based on utilizing algorithm 142A, file 201 is assigned to tier 1 (cumulative PBHCs=83). Similarly, without factoring in priority, policy 145E would assign file 202 to tier 3 (summed file heats=15). However, based on utilizing algorithm 142A, file 202 is assigned to tier 2 (cumulative PBHCs=23).

With respect to file 203 and file 204, policy 145D is invoked. Without factoring in priority, policy 145D would assign file 203 to tier 3 based on heat=8. However, utilizing algorithm 142A determines that respective PBHC-N for file 203=17 dictating that file 203 is assigned to tier 2. Similarly, without factoring in priority, policy 145D would assign file 204 to tier 3 based on heat=20. However, utilizing algorithm 142A policy 145D determines that PBHC-1 for file 203=8 dictating that file 203 is assigned to tier 3.

Figure 3:
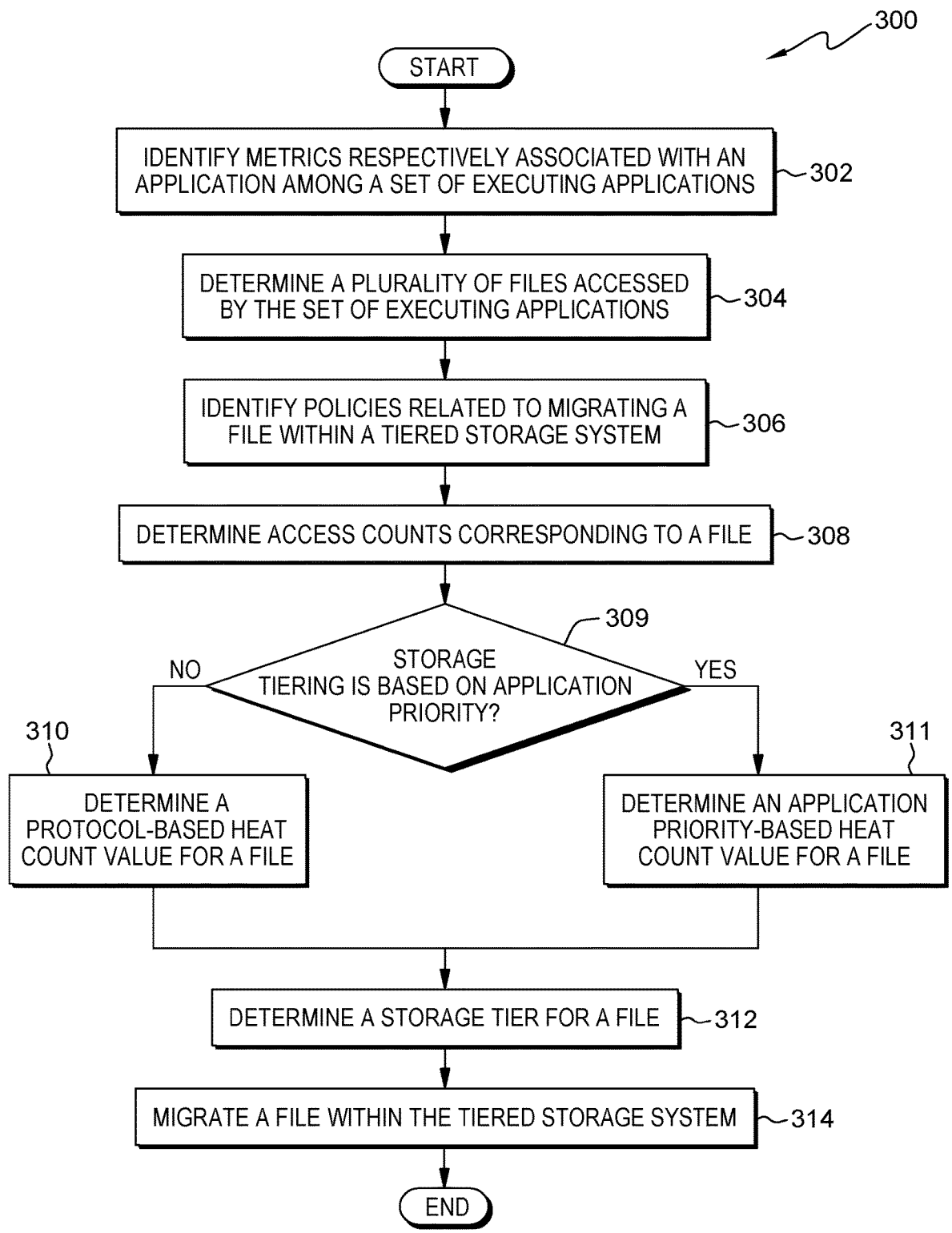
FIG. 3 depicts a flowchart of steps of an enhanced tiering program, in accordance with an embodiment of the present invention.

FIG. 3 is a flowchart depicting operational steps for enhanced tiering program 300, a program that determines a storage tier that stores an assigned file or receives a migrated file based, at least in part on heat count values respectively associated with file access protocols and/or priorities corresponding to executing client application (apps), in accordance with embodiments of the present invention. In various embodiments, enhanced tiering program 300 re-executes one or more steps in response to administrative environment 130 communicating information related to a change associated with the set of concurrently executing apps, such as another app begins to execute, a current app terminates, a user initiating a change to a "nice" value associated with an executing app, etc. In some scenarios, enhanced tiering program 300 continually executes as a function of ILM system 142. In other scenarios, enhanced tiering program 300 executes on a periodic basis in response to file system 141 determining that rate of access of one or more files changes more than a threshold amount.

In step 302, enhanced tiering program 300 identifies metrics respectively associated with an application among a set of executing applications. In an embodiment, enhanced tiering program 300 identifies metrics respectively associated with an app among a set of concurrently executing apps within data processing environment 120 based on information included within application information 135 and an SLA of SLAs 132 associated with the app. Metrics associated with an app may include priority information, a criticality value, a dictate identifying an analysis hierarchy among access protocols associated with a file accessed by two or more apps, weight factors related to a protocol and/or a criticality value, etc. Enhanced tiering program 300 may also determine changes related to a set of metrics of an executing app based on inputs received from a user or a client utilizing the app, such as modifying a "nice" value of an executing app. In various embodiments, enhanced tiering program 300 defines a set of concurrently executing apps as the two or more apps that are active within data processing environment 120 and intermittently access one or more files within unified storage environment 140 or are apps that execute during one or more monitoring periods utilized to determine respective heat values for files within unified storage environment 140.

In step 304, enhanced tiering program 300 determines a plurality of files accessed by the set of executing applications. In one embodiment, enhanced tiering program 300 determines a plurality of files accessed by the set of executing applications based on information included within file list 143. In another embodiment, enhanced tiering program 300 determines the plurality of files that are accessed by the set of executing apps based on RPCs associated with administrative environment 130 and an app, and information included within application information 135. In some embodiments, enhanced tiering program 300 further determines the respective protocol that each app of the set of executing apps utilizes to access a file from among the determined plurality of files.

In step 306, enhanced tiering program 300 identifies policies related to migrating a file within a tiered storage system. In an embodiment, enhanced tiering program 300 identifies information a related to a policy for assigning or migrating files within tiered storage system 150 based on information obtained from one or more sources, such as RPC metadata, application information 135, and/or SLAs 132. In an example, if enhanced tiering program 300 determines that a single app accesses the file, then enhanced tiering program 300 can determine a policy from among tiering policies 145 utilized to assign or migrating the file within tiered storage system 150 based on information associated with the app within application information 135. In some embodiments, enhanced tiering program 300 determines that two or more apps utilize a file. In response, enhanced tiering program 300 accesses application information 135, SLAs 132, and/or ILM system 142 to determine whether an app or group of apps dictate the type and/or analysis hierarchy among tiering policies that are utilized by the set of executing apps.

In some scenarios, enhanced tiering program 300 determines that the app with the highest-level SLA take precedence with regard to selecting among tiering policies of tiering policies 145 with regard to assigning or migrating a file within tiered storage system 150. For example, enhanced tiering program 300 determines that the highest-level SLA dictates multiple aspects of among tiering policies, such as a protocol-based heat count tiering policy, an analysis hierarchy among a group of protocol-based heat count tiering policies, and determining that the set of heat count values of a multi-protocol tiering policy is based at least the number of concurrently executing apps that access the same file. In other scenarios, enhanced tiering program 300 determines that the app with the highest criticality value takes precedence with regard to selecting among priority-based tiering policies of tiering policies 145 and determining whether an analysis hierarchy is defined in response to determining that two or more tiering policies are selected. In a further embodiment, enhanced tiering program 300 modifies (e.g., biases) a set of heat count values related to one or more tiering policies based on various factors, such as an SLA associated with an app, a priority assigned to an app, a criticality value of an app, a number of concurrently executing apps, etc.

In step 308, enhanced tiering program 300 determines access counts corresponding to a file. In one embodiment, enhanced tiering program 300 determines access counts corresponding to a file for a respective protocol based on information received from file system 141. Subsequently, enhanced tiering program 300 utilizes information related to tiered storage system 150 and a heat mapping program of file system 141 to determine the heat count values corresponding to a file for a respective protocol and stores the determined heat count values corresponding to the file within file metadata 144. In some embodiments, enhanced tiering program 300 stores the determined heat count values within another location (not shown) within unified storage environment 140. In an embodiment, enhanced tiering program 300 utilizes information associated with ILM system 142 to determine a monitoring period (e.g., window of time) that file system 141 configures to determine heat count values corresponding to files. In other embodiments, enhanced tiering program 300 determines other access count information corresponding to a file based on metadata related to the access file, such identifying cache hits and in-memory accesses of the file in addition to accessed processed by file system 141.

In decision step 309, enhanced tiering program 300 determines whether storage tiering is based on application priority. In one embodiment, enhanced tiering program 300 determines that storage tiering for a file associated with an app, is based on application priority by analyzing information associated with the app, such as information within application information 135, an SLA associated with the app, and/or an SLA associated with a client (i.e., user) executing the app. In some embodiments, enhanced tiering program 300 determines that storage tiering for a file utilized by multiple apps is based on application priority by analyzing precedence information associated with the multiple apps (in step 306). In other embodiments, enhanced tiering program 300 determines that storage tiering for a file associated with one or more apps, is based on file access protocols as opposed to application priority by analyzing information associated with the app, such as information within application information 135, an SLA associated with the app, and/or an SLA associated with a client (i.e., user) invoking the app.

Responsive to determining that storage tiering is not based on application priority (No branch, decision step 309), enhanced tiering program 300 determines a protocol-based heat count value for a file (step 310).

In step 310, enhanced tiering program 300 determines a protocol-based heat count value for a file. In one embodiment, enhanced tiering program 300 determines a protocol-based heat count value corresponding to a file based on retrieving protocol-based heat count values corresponding to the file within file metadata 144. In various embodiments, enhanced tiering program 300 determines a protocol-based heat count value corresponding to a file based on each protocol utilized to access the file. In some embodiments, enhanced tiering program 300 also determines a cumulative (e.g., a summation-based or total) protocol-based heat count value corresponding to a file that is accessed by two or more app. In a further embodiment, enhanced tiering program 300 determines a cumulative protocol-based heat count value corresponding to a file corresponding a combination of access protocols.

Referring to decision step 309, responsive to determining that storage tiering is based on application priority (Yes branch, decision step 309), enhanced tiering program 300 determines an application priority-based heat count value for a file (step 311).

In step 311, enhanced tiering program 300 determines an application priority-based heat count value for a file. In various embodiments, enhanced tiering program 300 determines an application priority-based heat count value priority-based heat count a file, such as an a PBHC respectively associated with at least the file and an app that accesses the file based on previously determined information one or more algorithms included within ILM system 142 (previously discussed with respect to FIG. 2b). In some embodiments, enhanced tiering program 300 also determines cumulative priority-based heat count values corresponding to a file that is accessed by two or more apps. In a further embodiment, if enhanced tiering program 300 determines that a set of priority-based tiering policies determines storage tiers based on factors in addition to heat count values, such as three protocols and various combinations of the three protocols; then enhanced tiering program 300 inter-relates the determined heat count values with respect to differing groupings or hierarchy of factors, such as protocol 1 thru 3, protocol combination A, protocol combination B, etc., and an app; as opposed to one protocol and a respective app.

In step 312, enhanced tiering program 300 determines a storage tier for a file. In one embodiment, enhanced tiering program 300 assigns a file to a storage tier based on information within application information 135. In another embodiment, enhanced tiering program 300 determines a storage tier assignment for a file based on comparing a protocol-based heat value determined in step 310 with the sets of heat count values respectively associated with one or more protocol-based tiering policies identified in step 306. In some embodiments, enhanced tiering program 300 determines a storage tier assignment for a file based on an analysis of a heat value or a cumulative heat value corresponding to a file and the sets of heat count values respectively associated with two or more protocol-based tiering policies and an analysis hierarchy among the two or more protocol-based tiering policies identified in step 306; also previously discussed with respect to FIG. 2A.

In other embodiments, enhanced tiering program 300 determines a storage tier assignment for a file based on an analysis of an effective heat value or a cumulative effective heat value corresponding to a file determined in step 311 and one or more priority-based tiering policies and respective sets of heat count values included within tiering policies 145 (previously discussed with respect to FIG. 2B) associated with one or more apps of a set of executing app. In a further embodiment, responsive to determining that storage tier assignments are based on criticality in addition to priority, enhanced tiering program 300 utilizes other priority-based tiering policies identified in step 306 to determine a storage tier assignment for a file.

In step 314, enhanced tiering program 300 migrates a file within the tiered storage system. In one embodiment, enhanced tiering program 300 migrates a file within tiered storage system 150 based on the tier determined for the file in step 312. In another embodiment, enhanced tiering program 300 determines that the current storage tier assignment of a file within tiered storage system 150 corresponds to the tier determined for the file in step 312. In response, enhanced tiering program 300 does not migrate the file. In some embodiments, enhanced tiering program 300 updates an instance of file metadata 144 corresponding to the file and/or application information 135 corresponding to an app that accessed the file to indicate an initial storage tier assignment for a file after a period of quiescence (i.e., inactivity) associate the file.

Figure 4:
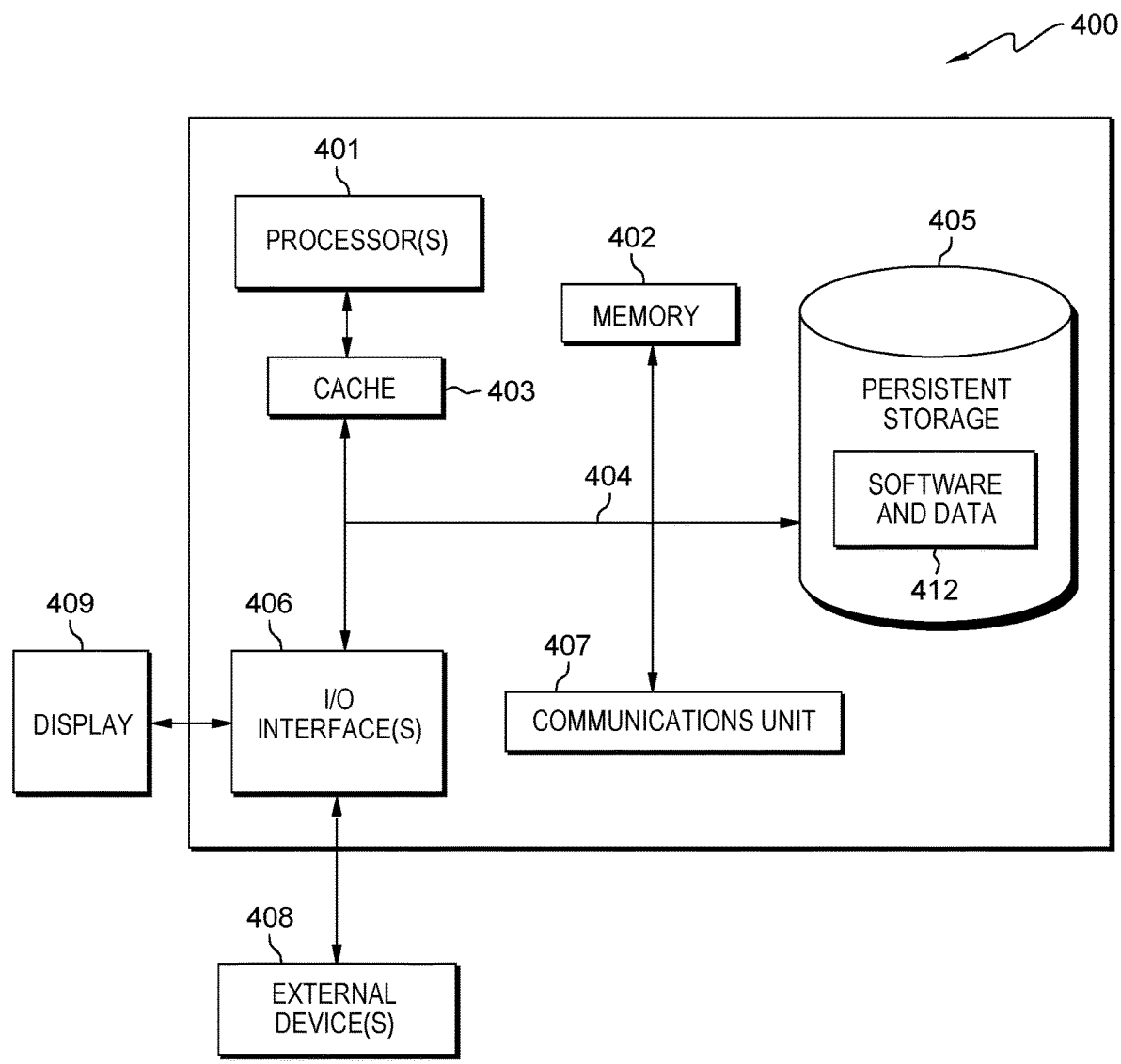
FIG. 4 is a block diagram of components of a computer, in accordance with an embodiment of the present invention.

FIG. 4 depicts computer system 400, which is representative of client 110-1, client 110-2 through client 110-N, data processing environment 120, administrative environment 130, and unified storage environment 140. Computer system 400 is an example of a system that includes software and data 412. Computer system 400 includes processor(s) 401, cache 403, memory 402, persistent storage 405, communications unit 407, input/output (I/O) interface(s) 406, and communications fabric 404. Communications fabric 404 provides communications between cache 403, memory 402, persistent storage 405, communications unit 407, and input/output (I/O) interface(s) 406. Communications fabric 404 can be implemented with any architecture designed for passing data and/or control information between processors (such as microprocessors, communications and network processors, etc.), system memory, peripheral devices, and any other hardware components within a system. For example, communications fabric 404 can be implemented with one or more buses or a crossbar switch.

Memory 402 and persistent storage 405 are computer readable storage media. In this embodiment, memory 402 includes random-access memory (RAM). In general, memory 402 can include any suitable volatile or non-volatile computer readable storage media. Cache 403 is a fast memory that enhances the performance of processor(s) 401 by holding recently accessed data, and data near recently accessed data, from memory 402.

Program instructions and data used to practice embodiments of the present invention may be stored in persistent storage 405 and in memory 402 for execution by one or more of the respective processor(s) 401 via cache 403. In an embodiment, persistent storage 405 includes a magnetic hard disk drive. Alternatively, or in addition to a magnetic hard disk drive, persistent storage 405 can include a solid-state hard drive, a semiconductor storage device, a read-only memory (ROM), an erasable programmable read-only memory (EPROM), a flash memory, or any other computer readable storage media that is capable of storing program instructions or digital information. In some embodiments, various elements of persistent storage 405 and/or memory 402 can also be assigned to a storage tier within tiered storage system 150, such a non-volatile storage class memory (SCM), in-memory storage, and other types of storage media described above.

The media used by persistent storage 405 may also be removable. For example, a removable hard drive may be used for persistent storage 405. Other examples include optical and magnetic disks, thumb drives, and smart cards that are inserted into a drive for transfer onto another computer readable storage medium that is also part of persistent storage 405. Software and data 412 are stored in persistent storage 405 for access and/or execution by one or more of the respective processor(s) 401 via cache 403 and one or more memories of memory 402. With respect to administrative environment 130, software and data 412 includes administrative controls 131, service-level agreements 132, client applications 134, application information 135, and other programs and data (not shown). With respect to unified storage environment 140, software and data 412 includes file system 141, ILM system 142, file list 143, file metadata 144, tiering policies 145, enhanced tiering program 300, and other programs and data (not shown).

Communications unit 407, in these examples, provides for communications with other data processing systems or devices, including resources of client 110-1, client 110-2 through client 110-N, administrative environment 130, and unified storage environment 140. In these examples, communications unit 407 includes one or more network interface cards.

Communications unit 407 may provide communications, through the use of either or both physical and wireless communications links. Program instructions and data used to practice embodiments of the present invention may be downloaded to persistent storage 405 through communications unit 407.

I/O interface(s) 406 allows for input and output of data with other devices that may be connected to each computer system. For example, I/O interface(s) 406 may provide a connection to external device(s) 408, such as a keyboard, a keypad, a touch screen, and/or some other suitable input device. External device(s) 408 can also include portable computer readable storage media, such as, for example, thumb drives, portable optical or magnetic disks, and memory cards. Software and data used to practice embodiments of the present invention can be stored on such portable computer readable storage media and can be loaded onto persistent storage 405 via I/O interface(s) 406. I/O interface(s) 406 also connect to display 409.

Display 409 provides a mechanism to display data to a user and may be, for example, a computer monitor. Display 409 can also function as a touch screen, such as the display of a tablet computer or a smartphone. Alternatively, display 409 displays information to a user based on a projection technology, such as virtual retinal display, a virtual display, or image projector.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
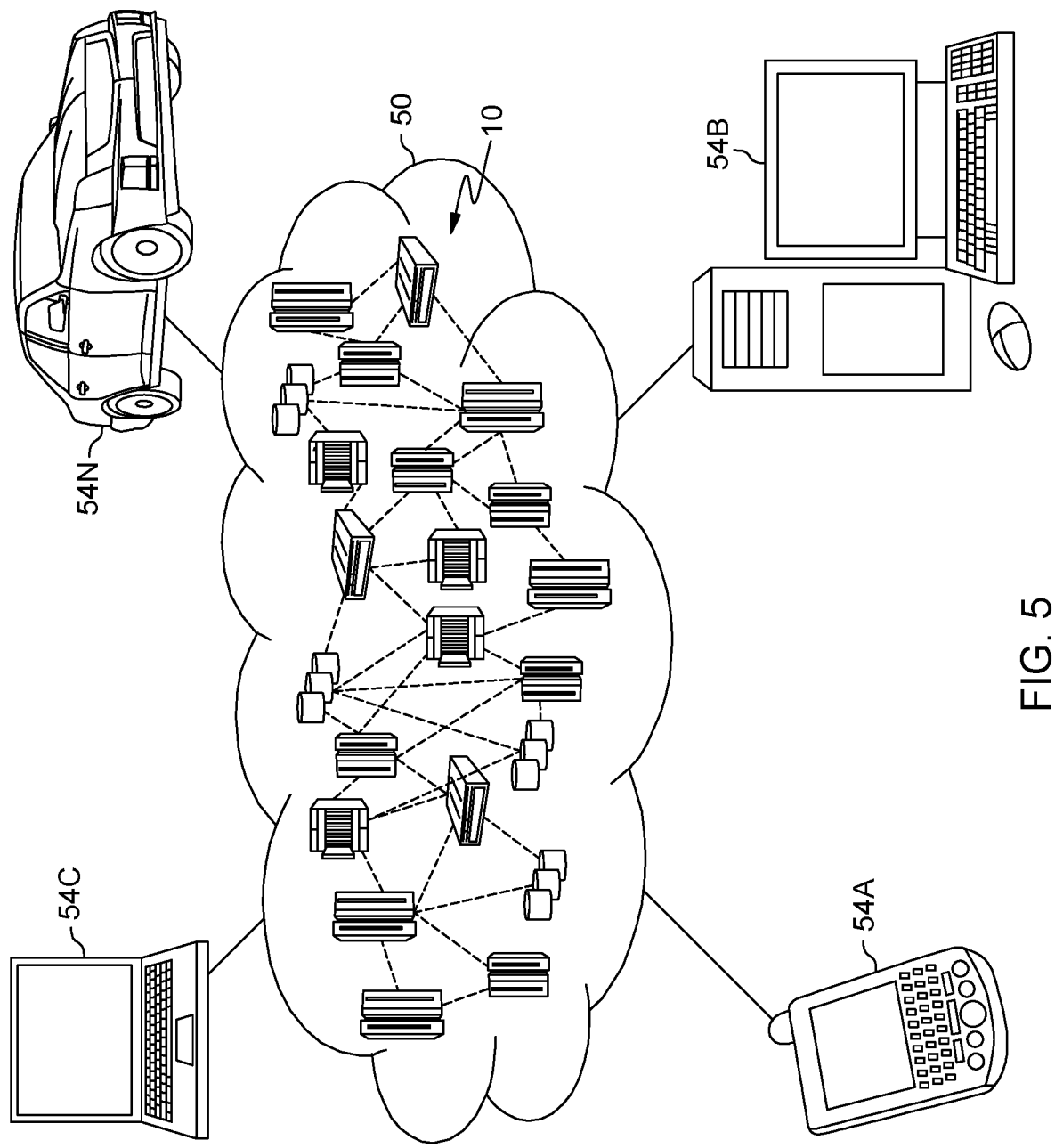
FIG. 5 depicts a cloud computing environment according to an embodiment of the present invention.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
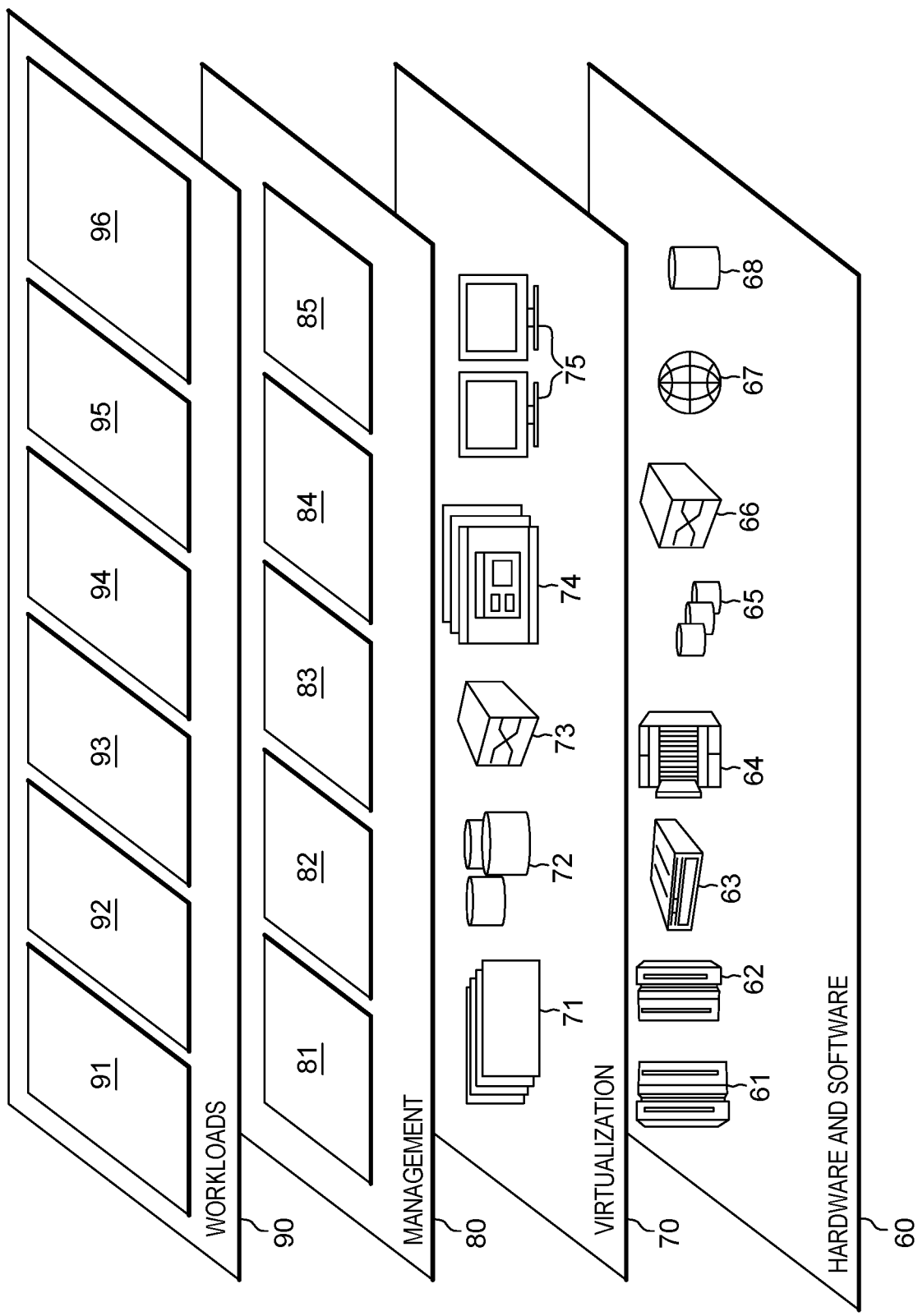
FIG. 6 depicts abstraction model layers according to an embodiment of the present invention.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65, such as tiered storage system 150; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. In an embodiment, various functions of management layer 80 are associated with aspects of administrative environment 130 and unified storage environment 140. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and software 96. In various embodiments of the present invention, software 96 is representative of information lifecycle management system 142 and enhanced tiering program 300, or corresponding processing capabilities, described in further detail respectively with regard to FIG. 1 and FIG. 3.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random-access memory (RAM), a read-only memory (ROM), an erasable programmable read-only memory (EPROM or Flash memory), a static random-access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method comprising:
    determining, by one or more computer processors, a plurality of files stored within a tiered storage environment that are accessed by a set of executing applications;
    identifying, by one or more computer processors, a group of two or more tiering policies utilized within the tiered storage environment;
    determining, by one or more processors, a monitoring period configured by a file system to determine heat count values corresponding to the plurality of files;
    within the determined monitoring period, determining, by one or more processors, access count information corresponding to a file of the plurality of files based on information received from the file system, the access count information including the heat count values corresponding to the plurality of files for a respective access protocol utilized to access each file;
    storing, by one or more processors, the determined heat count values corresponding to each file within file metadata;
    determining, by one or more computer processors, protocol-based heat count values corresponding to the plurality of files, wherein a protocol-based heat count value is generated based, at least in part, on retrieving the protocol-based heat count value corresponding to the file from the file metadata;
    storing, by one or more computer processors, the plurality of files among tiers of the tiered storage environment based on the identified group of two or more tiering polices and the protocol-based heat count values corresponding to the plurality of files;
    summing the protocol-based heat count values corresponding to the plurality of files;
    upgrading the tier of the tiered storage environment the plurality of files is stored in based, at least in part, on the sum of the protocol-based heat count values and the group of two or more tiering policies; and
    migrating the file within the upgraded tier of the tiered storage environment and updating an instance of file metadata corresponding to the file to indicate an initial storage tier assignment for the file after a period of quiescence associated with the file.

2. The method of claim 1, wherein identifying the group of two or more tiering policies utilized within the tiered storage environment is based, at least in part, on information respectively associated the set of executing applications, and wherein a first application of the set of executing applications accesses a first file utilizing a first protocol.

3. The method of claim 2, wherein identifying the group of two or more tiering policies utilized within the tiered storage environment is further based on one or more dictates related to a service level agreement (SLA) associated with an application of the set of executing applications.

4. The method of claim 1, wherein storing the plurality of files among tiers of the tiered storage environment based on the identified group of two or more tiering polices further comprises:
    determining, by one or more computer processors, an analysis hierarchy among the group of two or more tiering polices;
    analyzing, by one or more computer processors, the protocol-based heat count values corresponding to the plurality of files with respect to the analysis hierarchy among the group of two or more tiering polices; and
    assigning, by one or more computer processors, the plurality of files among storage tiers based on a determined set of heat count values respectively associated with the plurality of files and further based on the analysis hierarchy among the identified group of two or more tiering polices.

5. The method of claim 4, wherein a service level agreement (SLA) associated with at least one application of the set of executing applications dictates the analysis hierarchy among the identified group of two or more tiering policies, and wherein the SLA allows upgrading of a storage tier assignment of a file based on a subsequent tiering policy of the analysis hierarchy among tiering policies and prevents downgrading of the storage tier assignment of the file based on the subsequent tiering policy of the analysis hierarchy among the tiering policies.

6. The method of claim 4, wherein analyzing the protocol-based heat count values corresponding the plurality of files further comprises:
    responsive to determining that the file of the plurality of files is accessed utilizing two or more access protocols, determining, by one or more computer processors, a multi-protocol heat count value corresponding to the file and further associated with a combination of access protocols, wherein the multi-protocol heat count value corresponding to the file is a value corresponding to a sum of the heat count values corresponding to each access protocol of the combination of access protocols; and
    analyzing, by one or more computer processors, the protocol-based heat count values corresponding to the plurality of files and one or more multi-protocol heat count values corresponding to the file with respect to the analysis hierarchy among the group of two or more tiering polices.

7. The method of claim 1, wherein the identified group of two or more tiering policies further includes one or more multi-protocol tiering policies related to files accessed by two or more access protocols, and wherein a set of heat count values associated with a multi-protocol tiering policy are based on a combination of two or more access protocols utilized to access a file and the number of executing applications that utilize the combination of two or more access protocols utilized to access the file.

8. A computer program product comprising:
    one or more computer readable storage media and program instructions stored on the one or more computer readable storage media, the program instructions readable/executable by one or more computer processors:
    program instructions to determine a plurality of files stored within a tiered storage environment that are accessed by a set of executing applications;
    program instructions to identify a group of two or more tiering policies utilized within the tiered storage environment;

program instructions to determine a monitoring period configured by a file system to determine heat count values corresponding to the plurality of files;
within the determined monitoring period, program instructions to determine access count information corresponding to a file of the plurality of files based on information received from the file system, the access count information including the heat count values corresponding to the plurality of files for a respective access protocol utilized to access each file;
program instructions to store the determined heat count values corresponding to each file within file metadata;
program instructions to determine protocol-based heat count values corresponding to the plurality of files, wherein a protocol-based heat count value is generated based, at least in part, on retrieving the protocol-based heat count value corresponding to the file from the file metadata;
program instructions to store the plurality of files among tiers of the tiered storage environment based on the identified group of two or more tiering polices and the protocol-based heat count values corresponding to the plurality of files;
program instructions to sum the protocol-based heat count values corresponding to the plurality of files;
program instructions to upgrade the tier of the tiered storage environment the plurality of files is stored in based, at least in part, on the sum of the protocol-based heat count values and the group of two or more tiering policies; and
program instructions to migrate the file within the upgraded tier of the tiered storage environment and update an instance of file metadata corresponding to the file to indicate an initial storage tier assignment for the file after a period of quiescence associated with the file.

9. The computer program product of claim 8, wherein program instructions to identify the group of two or more tiering policies utilized within the tiered storage environment is based, at least in part, on information respectively associated the set of executing applications, and wherein a first application of the set of executing applications accesses a first file utilizing a first protocol.

10. The computer program product of claim 9, wherein program instructions to identify the group of two or more tiering policies utilized within the tiered storage environment is further based on one or more dictates related to a service level agreement (SLA) associated with an application of the set of executing applications.

11. The computer program product of claim 8, wherein program instructions to store the plurality of files among tiers of the tiered storage environment based on the identified group of two or more tiering polices further comprise:
program instructions to determine an analysis hierarchy among the group of two or more tiering polices;
program instructions to analyze the protocol-based heat count values corresponding to the plurality of files with respect to the analysis hierarchy among the group of two or more tiering polices; and
program instructions to assign the plurality of files among storage tiers based on a determined set of heat count values respectively associated with the plurality of files and further based on the analysis hierarchy among the identified group of two or more tiering polices.

12. The computer program product of claim 11, wherein a service level agreement (SLA) associated with at least one application of the set of executing applications dictates the analysis hierarchy among the identified group of two or more tiering policies, and wherein the SLA allows upgrading of a storage tier assignment of a file based on a subsequent tiering policy of the analysis hierarchy among tiering policies and prevents downgrading of the storage tier assignment of the file based on the subsequent tiering policy of the analysis hierarchy among the tiering policies.

13. The computer program product of claim 11, wherein program instructions to analyze the protocol-based heat count values corresponding to the plurality of files further comprises:
responsive to determining that a file of the plurality of files is accessed utilizing two or more access protocols, program instructions to determine a multi-protocol heat count value corresponding to the file and further associated with a combination of access protocols, wherein the multi-protocol heat count value corresponding to the file is a value corresponding to a sum of the heat count values corresponding to each access protocol of the combination of access protocols; and
program instructions to analyze the protocol-based heat count values corresponding to the plurality of files and one or more multi-protocol heat count values corresponding to the file with respect to the analysis hierarchy among the group of two or more tiering polices.

14. The computer program product of claim 8, wherein the identified group of two or more tiering policies further includes one or more multi-protocol tiering policies related to files accessed by two or more protocols, and wherein a set of heat count values associated with a multi-protocol tiering policy are based on a combination of two or more access protocols utilized to access a file and the number of executing applications that utilize the combination of two or more access protocols utilized to access the file.

15. A computer system comprising:
one or more computer processors;
one or more computer readable storage media; and
program instructions stored on the computer readable storage media for execution by at least one of the one or more computer processors, the program instructions comprising:
program instructions to determine a plurality of files stored within a tiered storage environment that are accessed by a set of executing applications;
program instructions to identify a group of two or more tiering policies utilized within the tiered storage environment;
program instructions to determine a monitoring period configured by a file system to determine heat count values corresponding to the plurality of files;
within the determined monitoring period, program instructions to determine access count information corresponding to a file of the plurality of files based on information received from the file system, the access count information including the heat count values corresponding to the plurality of files for a respective access protocol utilized to access each file;
program instructions to store the determined heat count values corresponding to each file within file metadata;
program instructions to store the plurality of files among tiers of the tiered storage environment based on the identified group of two or more tiering polices and the protocol-based heat count values corresponding to the plurality of files;
program instructions to sum the protocol-based heat count values corresponding to the plurality of files;

program instructions to upgrade the tier of the tiered storage environment the plurality of files is stored in based, at least in part, on the sum of the protocol-based heat count values and the group of two or more tiering policies; and program instructions to migrate the file within the upgraded tier of the tiered storage environment and update an instance of file metadata corresponding to the file to indicate an initial storage tier assignment for the file after a period of quiescence associated with the file.

16. The computer system of claim 15, wherein program instructions to identify the group of two or more tiering policies utilized within the tiered storage environment is based, at least in part, on information respectively associated the set of executing applications, and wherein a first application of the set of executing applications accesses a first file utilizing a first protocol.

17. The computer system of claim 16, wherein program instructions to identify the group of two or more tiering policies utilized within the tiered storage environment is further based on one or more dictates related to a service level agreement (SLA) associated with an application of the set of executing applications.

18. The computer system of claim 15, wherein program instructions to store the plurality of files among tiers of the tiered storage environment based on the identified group of two or more tiering polices further comprise:

program instructions to determine an analysis hierarchy among the group of two or more tiering polices;

program instructions to analyze the protocol-based heat count values corresponding to the plurality of files with respect to the analysis hierarchy among the group of two or more tiering polices; and program instructions to assign the plurality of files among storage tiers based on a determined set of heat count values respectively associated with the plurality of files and further based on the analysis hierarchy among the identified group of two or more tiering polices.

19. The computer system of claim 18, wherein a service level agreement (SLA) associated with at least one application of the set of executing applications dictates the analysis hierarchy among the identified group of two or more tiering policies, and wherein the SLA allows upgrading of a storage tier assignment of a file based on a subsequent tiering policy of the analysis hierarchy among tiering policies and prevents downgrading of the storage tier assignment of the file based on the subsequent tiering policy of the analysis hierarchy among the tiering policies.

20. The computer system of claim 18, wherein program instructions to analyze the protocol based heat count values corresponding to the plurality of files further comprises:

responsive to determining that a file of the plurality of files is accessed utilizing two or more access protocols, program instructions to determine a multi-protocol heat count value corresponding to the file and further associated with a combination of access protocols, wherein the multi-protocol heat count value corresponding to the file is a value corresponding to a sum of the heat count values corresponding to each access protocol of the combination of access protocols; and program instructions to analyze the protocol-based heat count values corresponding to the plurality of files and one or more multi-protocol heat count values corresponding to the file with respect to the analysis hierarchy among the group of two or more tiering polices.

* * * * *